(12) United States Patent
Schlom et al.

(10) Patent No.: US 7,765,827 B2
(45) Date of Patent: Aug. 3, 2010

(54) MULTI-STAGE HYBRID EVAPORATIVE COOLING SYSTEM

(75) Inventors: Leslie A. Schlom, Sherman Oaks, CA (US); Andrew J. Becwar, Cambria, CA (US)

(73) Assignee: Everest Acquisition Holdings, Inc., Bellevue, WA (US)

( * ) Notice: Subject to any disclaimer, the term of this patent is extended or adjusted under 35 U.S.C. 154(b) by 1243 days.

(21) Appl. No.: 11/269,431

(22) Filed: Nov. 8, 2005

(65) Prior Publication Data
US 2007/0101746 A1    May 10, 2007

(51) Int. Cl.
F25D 17/04    (2006.01)
F28D 5/00    (2006.01)
(52) U.S. Cl. .......................................... 62/309; 62/310
(58) Field of Classification Search ............... 62/309, 62/310
See application file for complete search history.

(56) References Cited

U.S. PATENT DOCUMENTS

| | | | |
|---|---|---|---|
| 2,732,190 A | 1/1956 | Mart | |
| 2,839,153 A | 6/1958 | Mollner | |
| 3,267,648 A | 8/1966 | Allcorn, Jr. | |
| 3,435,631 A * | 4/1969 | Wood, Jr. ..................... | 62/305 |
| 3,712,026 A | 1/1973 | Griffiths et al. | |
| 3,775,993 A | 12/1973 | Murphy | |
| 4,022,853 A | 5/1977 | Schulenberg | |
| 4,023,949 A | 5/1977 | Schlom et al. ................. | 62/309 |
| 4,107,940 A | 8/1978 | Schlom et al. ................. | 62/121 |
| 4,112,027 A | 9/1978 | Cates | |
| 4,137,058 A | 1/1979 | Schlom et al. ................. | 62/121 |
| 4,156,351 A | 5/1979 | Schlom et al. ................. | 62/121 |
| 4,269,796 A | 5/1981 | Glicksman et al. | |
| 4,312,646 A | 1/1982 | Fattinger et al. | |
| 4,361,426 A | 11/1982 | Carter et al. | |
| 4,380,910 A | 4/1983 | Hood et al. | |
| 4,418,527 A | 12/1983 | Schlom et al. ............. | 60/39.05 |
| 4,499,031 A | 2/1985 | Sexton et al. | |
| 4,544,513 A | 10/1985 | Otterbein | |

(Continued)

FOREIGN PATENT DOCUMENTS

WO    9851916 A1    11/1998

OTHER PUBLICATIONS

International Search Report and Written Opinion, International Patent Application Serial No. PCT/US2006/038779, mailed Sep. 14, 2007.

*Primary Examiner*—Cheryl J Tyler
*Assistant Examiner*—Filip Zec
(74) *Attorney, Agent, or Firm*—Seed Intellectual Property Law Group PLLC

(57) ABSTRACT

A multi-stage hybrid evaporative cooling system is described as having a direct evaporative cooling subsystem and an indirect evaporative cooling subsystem having one of a horizontal and a vertical set of heat exchanger channels. The multi-stage hybrid evaporative cooling system with a horizontal set of heat exchanger channels has a portion of the horizontal heat exchanger channels partially extended into a next stage of the multi-stage system. The multi-stage hybrid evaporative cooling system with the vertical set of heat exchanger channels includes a first set of vertical set of heat exchanger channels spanning a substantial vertical height of the stage of the hybrid evaporative cooling system, and a second set spanning approximately half the height of the stage. The multi-stage hybrid evaporative cooling system further includes a refrigeration system for lowering the temperature of the indirect evaporative cooling subsystem air without affecting its pressure flow.

14 Claims, 7 Drawing Sheets

U.S. PATENT DOCUMENTS

| | | | |
|---|---|---|---|
| 4,566,290 A | 1/1986 | Otterbein | |
| 4,660,390 A | 4/1987 | Worthington | |
| RE32,461 E | 7/1987 | De Peri | |
| 4,708,000 A | 11/1987 | Besik | |
| 4,827,733 A | 5/1989 | Dinh | |
| 4,926,656 A | 5/1990 | Hickley et al. | |
| 4,950,430 A | 8/1990 | Chen et al. | |
| 4,970,876 A | 11/1990 | Vinokurov | |
| 5,003,961 A | 4/1991 | Besik | |
| 5,076,347 A | 12/1991 | Fogleman | |
| 5,187,946 A | 2/1993 | Rotenberg et al. | |
| 5,193,352 A | 3/1993 | Smith et al. | |
| 5,227,054 A | 7/1993 | Gyulavari et al. | |
| 5,242,627 A | 9/1993 | Lundin | |
| 5,312,464 A | 5/1994 | Gay | |
| 5,349,829 A | 9/1994 | Tsimerman | |
| 5,390,505 A | 2/1995 | Smith et al. | |
| 5,392,944 A | 2/1995 | Jennings | |
| 5,555,742 A | 9/1996 | Kelley | |
| 5,660,048 A | 8/1997 | Belding et al. | |
| 5,664,433 A | 9/1997 | Bourne et al. | |
| 5,727,394 A | 3/1998 | Belding et al. | |
| 5,879,434 A | 3/1999 | Kiss | |
| 5,911,745 A | 6/1999 | Conner | |
| 5,927,097 A | 7/1999 | Wright | |
| 6,003,327 A | 12/1999 | Belding et al. | |
| 6,050,100 A | 4/2000 | Belding et al. | |
| 6,385,987 B2 | 5/2002 | Schlom et al. | 62/304 |
| 6,418,728 B1 | 7/2002 | Monroe | |
| 6,640,575 B2 * | 11/2003 | Word | 62/314 |
| 2004/0069003 A1 | 4/2004 | Pruitt | |
| 2005/0076665 A1 | 4/2005 | Pruitt | |

* cited by examiner

MULTI-STAGE HYBRID EVAPORATIVE COOLING SYSTEM

BACKGROUND OF THE INVENTION (1) Field of the Invention

This invention relates to a method and apparatus for cooling systems and, more particularly, to a multi-stage hybrid evaporative cooling systems.

(2) Description of Related Art

The power degradation curves of most power generating systems are such that as the temperature of air increases, the output power of these power systems decreases due to a decrease in the density of the air. In other words, most power generating systems require an intake of dense air for a more efficient operation in terms of greater power output. That is, the denser the air, the greater the operating efficiency of the power generators. It is well known that cooler air is denser than warmer air, and hence, today's power generating intake systems are generally coupled with air cooling systems, which provide the power generating units with cooler, and hence, more denser air for a more efficient operation of the power units. Therefore, it could be said that the cooling systems indirectly function as power augmentation systems for power generating systems by increasing their efficiency, and hence, their output power.

Traditional methods for providing cooler denser air to increase overall power generating efficiency include steam injection, refrigeration, fogging, and direct evaporative cooling of air. A less expensive approach to increasing the intake air density by cooling, other than these conventional methods, is an indirect evaporative approach. Prior patents in this area include Schlom et al.: U.S. Pat. Nos. 4,023,949; 4,107,940; 4,137,058; 4,156,351 and 4,418,527; Fogelman: U.S. Pat. No. 5,076,347; and Kopko: WO9851916A1.

A recently developed method for cooling air is the hybrid evaporative cooling system (known as the "Schlom" cycle) disclosed in the U.S. Pat. No. 6,385,987 to Schlom et al., which may be used as standalone air cooler or with different power generating systems. The entire disclosure of the U.S. Pat. No. 6,385,987 to Schlom et al, issued May 14, 2002, is incorporated herein by this reference, and the information incorporated herein is as much a part of this application as filed as if the entire text and drawings of the U.S. Pat. No. 6,385,987 were repeated in this application, and should be treated as part of the text and drawings of this application as filed.

The heat exchangers disclosed in U.S. Pat. No. 6,385,987 are useful for both single and multiple unit indirect evaporative processes. The evaporative apparatus for cooling comprises both a multi-stage indirect evaporative cooling heat exchanger, and a multi-stage sump where each sump stage, in a one-to-one relationship with a stage of the multi-stage heat exchanger has sump water at progressively cooler temperatures as air progresses further into the heat exchanger. Because there are separate, and completely sealed and isolated stages of the heat exchanger and the water sumps (creating thermal isolation between the stages), progressive cooling is induced on dry side output air. Other multistage heat exchangers with their associated multistage sumps can be combined, with the cooled air of a first multistage evaporative assembly feeding into the intake end of a second multistage evaporative assembly, and so on, with each sealed stage of the multistage assembly being thermally isolated.

Areas in which additional increased efficiency of the hybrid evaporative cooling system disclosed in the U.S. Pat. No. 6,385,987 might be improved include a better heat exchange and coolant evaporation processes, and the use of a novel refrigeration processes, bringing the "room" inlet dry-bulb temperature as close as possible to the exhaust air wet-bulb temperature so as to increase the thermodynamic efficiency of the actual process.

BRIEF SUMMARY OF THE INVENTION

The present invention provides and uses improved heat exchange, coolant evaporation, and novel refrigeration processes to improve the efficiency of a multi-stage hybrid evaporative cooling system.

One aspect of the present invention provides a multi-stage hybrid evaporative cooling system, comprising:

a direct evaporative cooling subsystem within a stage of the multi-stage hybrid evaporative cooling system;

an indirect evaporative cooling subsystem within the stage of the multi-stage hybrid evaporative cooling system, with a portion of the indirect evaporative cooling subsystem within the stage of the multi-stage hybrid evaporative cooling system partially extending into a next stage thereby facilitating a further cooling of the next stage direct evaporative cooling subsystem.

One optional aspect of the present invention provides a multi-stage hybrid evaporative cooling system, wherein:

the direct evaporative cooling subsystem is comprised of a sump within the stage of the multi-stage hybrid evaporative cooling system for holding a coolant that is provided to a set of heat exchangers within the stage of the multi-stage hybrid evaporative cooling system by a pump that moves the coolant to a distribution manifold for delivery of the coolant on to the heat exchangers, wherein a direct evaporative cooling subsystem airflow evaporates the coolant flowing down an exterior surface of the heat exchanger for indirect evaporative cooling of an indirect evaporative cooling subsystem airflow.

Another optional aspect of the present invention provides a multi-stage hybrid evaporative cooling system, wherein:

the direct evaporative cooling subsystem generates a latent heat of evaporation, which causes a conductive heat transfer for the indirect evaporative cooling subsystem at a lower temperature, thereby lowering an indirect evaporative cooling subsystem airflow.

Yet another optional aspect of the present invention provides a multi-stage hybrid evaporative cooling system, wherein:

the direct evaporative cooling subsystem is comprised of:

an exhaust unit in the stage of the multi-stage hybrid evaporative cooling system for exhausting a direct evaporative cooling subsystem airflow from the direct evaporative cooling subsystem; and a moisture eliminator in the stage of the multi-stage hybrid evaporative cooling system for removing coolant droplets from the direct evaporative cooling subsystem airflow prior to exhausting the direct evaporative cooling subsystem airflow from the direct evaporative cooling subsystem.

A further optional aspect of the present invention provides a multi-stage hybrid evaporative cooling system, wherein:

the exhausted direct evaporative cooling subsystem airflow is directed to external systems for cooling of the external systems.

Still a further optional aspect of the present invention provides a multi-stage hybrid evaporative cooling system, wherein:

the direct evaporative cooling subsystem is comprised of:
an exhaust unit for exhausting a direct evaporative cooling subsystem airflow from the direct evaporative cooling subsystem; and
a moisture eliminator in the stage of the multi-stage hybrid evaporative cooling system for removing coolant droplets from the direct evaporative cooling subsystem airflow prior to exhausting the direct evaporative cooling subsystem airflow from the direct evaporative cooling subsystem.

Another optional aspect of the present invention provides a multi-stage hybrid evaporative cooling system, wherein:
the coolant within the sump of a final stage of the multi-stage hybrid evaporative cooling system is provided to a media pump, moving the coolant to a distribution system for distributing coolant along a top of a media for further cooling and washing the indirect evaporative cooling subsystem airflow.

Yet another optional aspect of the present invention provides a multi-stage hybrid evaporative cooling system, wherein:
the coolant from the media further lowers the temperature of the indirect evaporative cooling subsystem air flow due to further evaporation of the coolant; and
the further evaporation of the coolant results in a lower dry bulb temperature, causing a further reduction of the temperature of the coolant in a media sump, which when drained into the final stage sump, reduces a temperature of the coolant present within the final stage sump.

A further optional aspect of the present invention provides a multi-stage hybrid evaporative cooling system, wherein:
the direct evaporative cooling subsystem is comprised of:
a refrigeration unit for further cooling of the direct evaporative cooling subsystem air.

Still a further optional aspect of the present invention provides a multi-stage hybrid evaporative cooling system, wherein:
a condenser coil of the refrigeration unit is positioned along a path of a direct evaporative cooling subsystem airflow.

Another optional aspect of the present invention provides a multi-stage hybrid evaporative cooling system, wherein:
the refrigeration unit is comprised of:
an expansion device for expanding a liquid refrigerant into a low temperature vapor refrigerant;
an evaporator-chiller for lowering a coolant temperature using the low temperature vapor refrigerant from the expansion device;
a compressor for compressing the low temperature vapor refrigerant from the evaporator-chiller to a high temperature gaseous refrigerant due to heat of compression; and
a condenser coil for cooling the high temperature gaseous refrigerant from the compressor into a medium temperature liquid refrigerant, and fed to the expansion device.

Yet another optional aspect of the present invention provides a multi-stage hybrid evaporative cooling system, wherein:
a coolant from a first stage sump of one or more stages is moved by a pump into the evaporator-chiller for lowering a temperature of the coolant, and is moved to a last stage sump of one or more stages;
whereby excess coolant in the last stage sump is cascaded down to a preceding stage sump, thereby lowering coolant temperature of the preceding stage sump.

A further optional aspect of the present invention provides a multi-stage hybrid evaporative cooling system, wherein:
the heat exchangers are comprised of a separate set of plates to form separate heat exchangers for a stage, with independently created heat exchangers within each stage aligned to form continuous channels for an airflow of the indirect evaporative cooling subsystem air from one stage to the next.

Another optional aspect of the present invention provides a multi-stage hybrid evaporative cooling system, wherein:
the heat exchangers are comprised of an upper set of plates that span an entire horizontal length of all the stages of the hybrid evaporative cooling system, and a lower of plates that partially span an entire horizontal length of each stage, with both the upper and the lower set of any subsequent stage heat exchangers being an extension of a preceding stage heat exchangers.

Another aspect of the present invention provides a multi-stage hybrid evaporative cooling system, comprising:
an indirect evaporative cooling subsystem within a stage of the multi-stage hybrid evaporative cooling system;
a direct evaporative cooling subsystem within the stage of the multi-stage hybrid evaporative cooling system, with a first portion of the direct evaporative cooling subsystem substantially extending a vertical length of the stage, and a second portion partially extending the vertical length of the stage, thereby facilitating a further cooling of a next stage indirect evaporative cooling subsystem.

Another optional aspect of the present invention provides a multi-stage hybrid evaporative cooling system, wherein:
the indirect evaporative cooling subsystem includes an indirect evaporative cooling subsystem enclosure for preventing an interchange of indirect evaporative cooling subsystem air pattern and direct evaporative cooling subsystem air pattern, the indirect evaporative cooling subsystem enclosure, comprising:
a top header for preventing flow of a coolant to within the indirect evaporative cooling subsystem enclosure;
at least one divider for maintaining separation between indirect evaporative cooling subsystem airflows;
a bottom header for preventing flow of a direct evaporative cooling subsystem air to within the indirect evaporative cooling subsystem enclosure.

Yet another optional aspect of the present invention provides a multi-stage hybrid evaporative cooling system, wherein:
the at least one divider separates the stage of the multi-stage hybrid evaporative cooling system into two or more horizontal sections for maintaining separation between indirect evaporative cooling subsystem airflows, thereby allowing the indirect evaporative cooling subsystem airflows through a first of the two or more horizontal sections to exit out of the indirect evaporative cooling subsystem enclosure and into the direct evaporative cooling subsystem, and allowing indirect evaporative cooling subsystem airflows through a second of the two or more horizontal sections to continue into the indirect evaporative cooling subsystem enclosure within a next stage.

A further optional aspect of the present invention provides a multi-stage hybrid evaporative cooling system, wherein:
the direct evaporative cooling subsystem is comprised of a sump within the stage of the multi-stage hybrid evaporative cooling system for holding a coolant that is provided to a set of heat exchangers within the stage of the multi-stage hybrid evaporative cooling system by a pump that moves the coolant to a delivery manifold for delivery of the coolant within the heat exchanger channels, wherein a direct evaporative cooling subsystem airflow within the heat exchanger channels evaporates the coolant flowing down within the heat exchanger channels for indirect evaporative cooling of an indirect evaporative cooling subsystem airflow exterior to the heat exchanger channels.

Another optional aspect of the present invention provides a multi-stage hybrid evaporative cooling system, wherein:

the heat exchangers are comprised of a set of plates forming a vertical set of heat exchanger channels;

with a first set of vertical set of heat exchanger channels spanning a substantial height of the stage of the hybrid evaporative cooling system, and a second set of the vertical set of heat exchangers channels spanning approximately half the height of the of the hybrid evaporative cooling system.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

Figure 1:
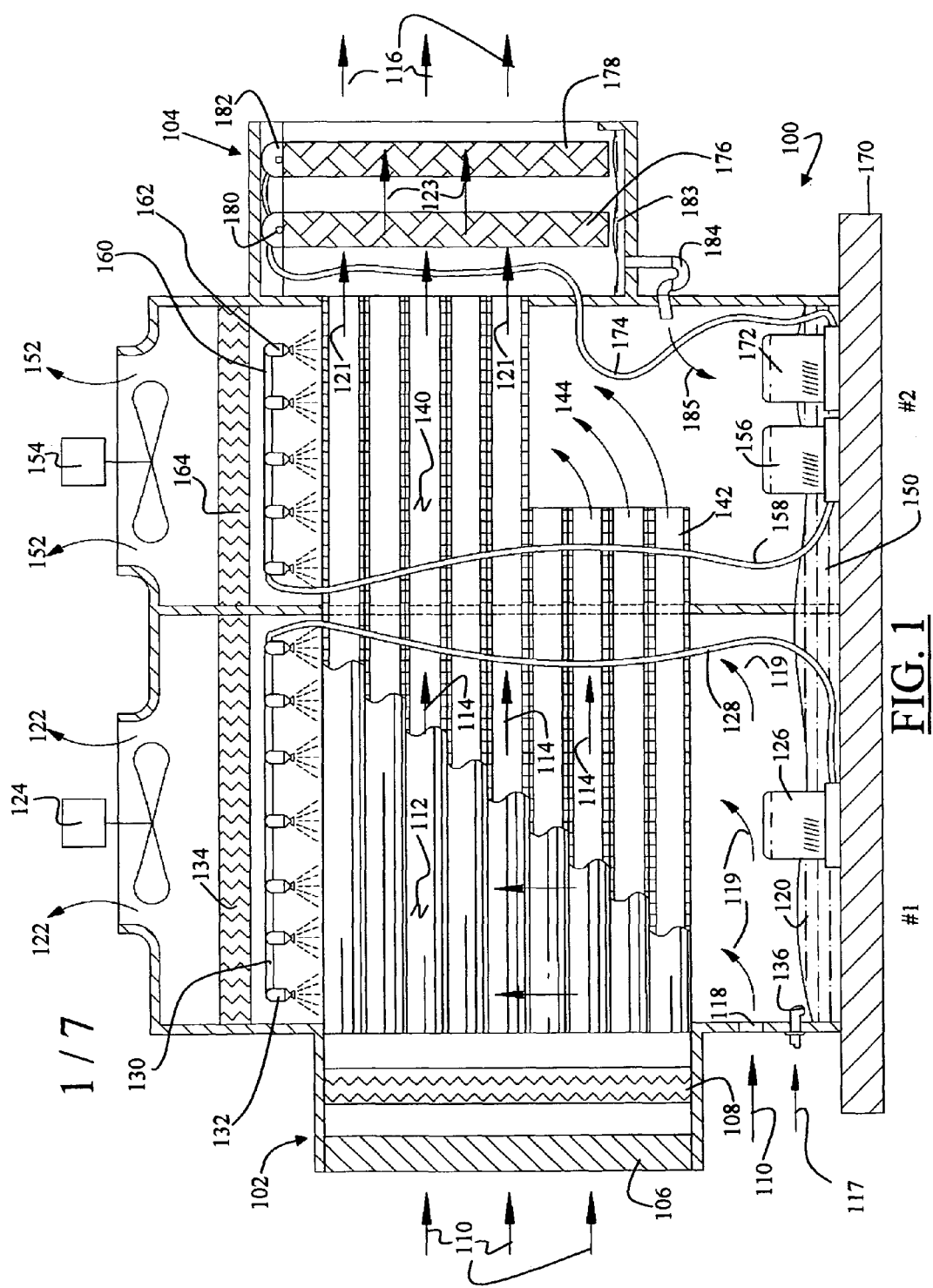
FIG. 1 is an exemplary illustration for an embodiment for a multi-stage hybrid evaporative cooling system in accordance with the present invention.

FIG. 1 is an exemplary illustration for an embodiment for a multi-stage hybrid evaporative cooling system 100 in accordance with the present invention that may be used as a standalone or with different power generating systems. As illustrated, system 100 is comprised of an air intake housing 102, one or more different isolated cooling chambers or stages (only two stages (#1 and #2) are shown), and an air discharge housing 104. The pluralities of different stages are isolated, with each stage comprised of a direct evaporative cooling subsystem and an indirect evaporative cooling subsystem. The sizes of each stage may vary based upon the thermal exchange capacity of each stage and the overall system.

Each stage within the multi-stage hybrid evaporative cooling system 100 is completely sealed from the next successive stage to isolate the wet-bulb temperature of one stage from a subsequent stage. The system 100 includes a set of heat exchangers for each stage, which are generally comprised of plates that are arranged in pairs to form continuous horizontal channels from one stage to the next subsequent stage for airflow. The interior of the continuous horizontal channels for the airflow is where the indirect evaporative cooling processes take place. In other words, conductive heat transfer takes place within the heat exchanger channels between the indirect evaporative cooling subsystem airflow and the interior walls of the heat exchanger channels to cool the air flowing within the channels. The exterior of these horizontal heat exchanger channels is where the direct evaporative cooling processes occur. FIG. 1 shows a schematic section of only a two-stage version for the multi-stage hybrid evaporative cooling system 100 of the present invention, showing various airflow paths.

The multi-stage hybrid evaporative cooling system 100 illustrated in FIG. 1 may be coupled with a power generating unit (not shown), with the cooler dense (or useful) air (from the indirect evaporative cooling subsystem of the system 100) fed to an intake unit of a power generating system. As illustrated, ambient air 110 is pulled into the system 100 through the air intake housing 102, passing an air intake unit 106, an air intake filter 108, and into the first stage heat exchangers 112 as indirect evaporative cooling subsystem airflow 114. As described above, the first stage heat exchangers 112 are generally comprised of plates that are arranged in pairs to form continuous horizontal channels from one stage to the next subsequent stage, within which the indirect evaporative cooling subsystem air 114 flows. The indirect evaporative cooling subsystem airflow 114 is the air that is maintained dry, progressively cooled down at each stage as it moves through the continuous horizontal heat exchanger channels that extend to the next subsequent stage, and exhausted through the air discharge housing 104. Optionally, the exhausted airflow 116 may be subsequently used by the intake system of a power-generating unit as a cooler, denser air.

The ambient air 110 is also pulled into system 100 through a lower air intake opening 118 and into the direct evaporative cooling subsystem as airflow 119. The direct evaporative cooling subsystem airflow 119 passes over a first stage sump 120, and is subsequently drawn up (illustrated as the two straight, vertical up arrows), and exhausted out (referenced as 122) into the atmosphere by the first stage direct evaporative cooling subsystem fan 124. The first stage sump 120 further includes a first stage pump 126 that moves coolant stored within the first stage sump 120 through a first stage tube 128 to a first stage coolant distribution manifold 130. The coolant distribution manifold 130 is comprised of one or more nozzles or other coolant delivery mechanisms 132 through which coolant (such as water) is sprayed or delivered by other means, and cascades down the exterior portion of the first stage heat exchangers 112 to cool down the heat exchanger. The direct evaporative cooling subsystem airflow 119 (or wet airflow) moving up the first stage of system 100 contacts the cascading coolant (and hence the term "wet airflow"), and facilitates the evaporation of the cascading coolant. This evaporation directly cools the interior ambient air of stage #1 within the direct evaporative cooling subsystem, and indirectly (through latent heat of evaporation) cools the dense or useful airflow 114 within the channels of the first stage heat exchangers 112. In other words, the wet side airflow 119 within the first stage causes the direct evaporation of the coolant, and the dry side airflow 114 is cooled indirectly by this evaporation through conductive heat transfer by coming into contact with the interior walls of the heat exchanger channels.

The drawn up wet airflow 122 move up by the first stage direct evaporative cooling subsystem fan 124, with coolant droplets impinging upon a first stage moisture eliminator element 134, which filters out most of the droplet moisture from the airflow 119 prior to exhaustion. Therefore, the remaining exhausted airflow 122 is generally air with high humidity (assuming the coolant is water) with no droplets, and the filtered-out coolant droplets that are impinged upon the moisture eliminator filter 134 simply drain down back into the first stage sump 120. Accordingly, the coolant is recycled and the first stage motor fan 124 remains fairly dry. In addition, moist wet airflow 119 is not fed back into the atmosphere, proximal to the air intake housing 102 of the indirect evaporative cooling subsystem of the multi-stage hybrid evaporative cooling system 100. Coolant 117 may be replenished through a coolant inlet 136 as described below in relation to FIG. 2.

The exhausted, cool, direct evaporative cooling subsystem airflow 122 may be used to cool the temperature of other systems. For example, the cool airflow 122 may be used to cool down generator and or turbine rooms, including lubrication oil used by other external systems. Conventionally, prior art systems use large size fans for cooling. This use of cooler airflow 122 can eliminate the need for large sized fans. Instead, using the already cooled airflow 122, smaller sized fans can be used to cool the ambient temperature with the in flow of cooler air 122, saving on the energy expenditure used for operating the larger fans. Accordingly, the exhausted moist airflow 122 may be used for cooling down generator and or turbine rooms, including lubrication oil used by other external systems, and the exhausted dense airflow 116 may be used by the intake system of a power-generating unit as a cooler, denser air for a more efficient operation.

The present invention uses the thermodynamic relationship between latent heat and sensible (conductive) heat for a more efficient cooling of the indirect evaporative cooling subsystem airflows 114 in the first stage and air 121 in the second stage. That is, the multi-stage hybrid evaporative cooling system 100 uses the relationship between the heat that is associated with a change in temperature (sensible heat) in contrast to a heat interchange associated with a change of state (latent heat). Latent heat is the heat that is either released or absorbed by a unit mass of a substance when it undergoes a change of state (a phase change), such as during evaporation, condensation, or sublimation, but not its temperature (e.g., the coolant within the system 100 at or during the change of phase remains the same temperature). In this instance, when the coolant evaporates within the first stage, it absorbs heat from within that stage to evaporate, and hence, the coolant changes its state, and this absorbed heat from the ambient air of the system 100 reduces the ambient temperature within the stage to decrease the sensible heat.

The sensible heat is one that can be felt, sensed, or detected, by a change in the temperature of the system. Sensible heat is the heat absorbed or transmitted when the temperature of a substance changes, but the substance does not change state. It is the conductive heat added or subtracted that causes a change in temperature. The evaporation of the coolant absorbs ambient heat, causing a reduction (subtraction) in the sensed temperature (sensible heat) at the first stage heat exchanges 112, cooling down indirect evaporative cooling subsystem airflows (or useful) air 114 within the first stage and 121 within the second stage inside the channels of the respective heat exchanger 112 and 140 through conductive heat transfer.

In terms of molecular interplay, the coolant changes from a liquid to a vapor state, which requires a gain of molecular kinetic energy. This gain of molecular kinetic energy is at the expense of the remaining coolant, which loses that same amount of energy, expressed as the latent heat of evaporation. Thus, the temperature of the un-evaporated coolant and the first stage heat exchange surfaces in contact with it reflect some decrease in their molecular kinetic energy (conservation of energy). The reduced molecular kinetic energy is expressed as a decreased sensible heat, which reduces the temperature of the indirect evaporative cooling subsystem air 114 and 121 through conductive heat transfer.

As further illustrated in FIG. 1, the second stage heat exchangers are comprised of an upper set of second stage heat exchangers 140 that span a full horizontal length of the second stage, and a lower set of second stage heat exchanges 142 that partially extend the full horizontal length of the second stage. As with the first stage heat exchangers 112, both sets of the second stage heat exchangers 140 and 142 are generally comprised of plates that are arranged in pairs to form continuous horizontal channels from one stage to the next subsequent stage for indirect evaporative cooling subsystem airflow. Therefore, the indirect evaporative cooling subsystem air 114 flowing from the first stage heat exchanger channels continuously flows through the channels of the upper set of the second stage heat exchanger 140 as a much cooler air 121 and is exhausted through the air discharge housing 104. The indirect evaporative cooling subsystem air 114 flowing from the first stage heat exchanger channels also continuously flows through the channels of the lower set of the second stage heat exchanger 142 and is exhausted into the second stage, which becomes a much cooler direct evaporative cooling subsystem air 144.

In one embodiment, the heat exchangers within each stage may be comprised of a separate set of plates to form separate heat exchangers for a stage, so long as the heat exchangers that are independently created within each stage are aligned to form continuous horizontal channels for the airflow of the indirect evaporative cooling subsystem air from one stage to the next. In another embodiment, the first stage plates of the first stage heat exchangers may span the entire length of all the stages of the multi-stage hybrid evaporative cooling system 100. In this case, both the upper and the lower set of any subsequent stage heat exchangers would be mere extension of the preceding stage heat exchangers. However, regardless of the embodiment used to form the heat exchangers, the present invention provides for a lower set of heat exchangers that do not fully extend or span across the entire horizontal length of any one particular stage (or a subsequent stage thereof), but are only partially extended across the horizontal length of a stage.

As illustrated in FIG. 1, some of the indirect evaporative cooling subsystem (dry side) airflow 114 within the channels of the first stage heat exchangers 112 is exited and redirected out of the lower set of the second stage heat exchangers 142, and into the direct evaporative cooling subsystem as second stage direct evaporative cooling subsystem air 144. The second stage direct evaporative cooling subsystem airflow 144 is cooler than the preceding stage airflow 119 because the second stage direct evaporative cooling subsystem airflow 144 has already gone through the first stage heat exchangers 112 as air flow 114, and therefore, has been substantially cooled. In addition, in accordance with the present invention, the second stage direct evaporative cooling subsystem airflow 144 has also traversed the lower set of the second stage heat exchangers 142, which are cooler than the first stage heat exchangers 112, the reasons for which are described below. Therefore, the airflow exiting out of these particularly lower set of heat exchangers 142 is in fact cooler than the airflow in the preceding stage channels of the heat exchangers 112.

The lower set of any subsequent stage heat exchangers further facilitates the evaporation of a lower temperature cascading coolant to take place on the outside surfaces of these lower set of heat exchangers with a lower wet bulb temperature air. This causes further reduction in the temperature of the indirect evaporative cooling subsystem air exiting through, and out into the subsequent stage. More specifically, and in relation to FIG. 1, the lower set of the second stage heat exchangers 142 allows further evaporation of coolant at even lower temperature to take place on the outside surfaces of the lower set of the second stage heat exchangers 142. This causes a further reduction in temperature of the indirect evaporative cooling subsystem airflow 114 before it emerges out into the direct evaporative cooling subsystem of the next subsequent stage (the second stage), as direct evaporative cooling subsystem air 144.

In general, the lower set of any subsequent stage heat exchangers have a length of approximately equal to about one-half the horizontal length of a stage. The actual number of channels that constitute a height of the lower set of any subsequent stage heat exchangers is generally equal to or less than the number of channels of the fully extended upper channels of the upper set of the second stage heat exchangers within which the lower set terminates. That is, the number of channels of the lower set of any subsequent stage heat exchangers is equal to or less than the number of channels that constitute the upper set of any subsequent stage heat exchanges.

The much cooler direct evaporative cooling subsystem air 144 at the second stage passes over a second stage sump 150, and is subsequently drawn up and drawn out (referenced as 152) into the atmosphere by a second stage direct evaporative cooing subsystem fan 154. The second stage sump 150 further includes a second stage pump 156 that moves coolant stored within the second stage sump 150 through a second stage tube 158 to a second stage coolant distribution manifold 160. The second stage coolant distribution manifold 160 is comprised of one or more nozzles or other coolant delivery mechanisms 162 through which coolant (such as water) is sprayed or delivered by other means, and cascades down the exterior portion of the upper and lower set of second stage heat exchangers 140 and 142 to cool down the channels of the upper and lower heat exchanger of the second stage. The second stage direct evaporative cooling subsystem airflow 144 (or wet airflow) moving up the second stage of system 100 contacts the cascading coolant, and facilitates the evaporation of the cascading coolant. This evaporation directly cools the interior ambient air of stage #2 within the direct evaporative cooling subsystem, and indirectly cools the dense or useful airflow 121 within the upper and lower set of the second stage heat exchangers 140 and 142. In other words, the wet side airflow within the second stage causes the direct evaporation of the coolant, and the dense side airflow 121 is cooled indirectly by this evaporation through conductive heat transfer between itself and the interior walls of the heat exchanger channels. The direct evaporative cooling subsystem air 144 moving up the second stage facilitates the further evaporation of the cascading coolant at even lower temperature on the surfaces of the second stage heat exchangers 140 and 142. This evaporation directly cools the ambient air (due to latent heat of vaporization) within the second stage of the system 100 further, and indirectly further cools the indirect evaporative cooling subsystem air 121 flowing within both the upper and lower set of second stage heat exchangers 140 and 142 through conductive heat transfer.

The drawn up wet airflow 152 move up by the second stage direct evaporative cooling subsystem fan 154, with coolant droplets impinging upon a second stage moisture eliminator element 164, which filters out most of the droplet moisture from the airflow prior to exhaustion. Therefore, the remaining exhausted airflow 152 is generally air with high humidity (assuming the coolant is water) with no droplets, and the filtered-out coolant droplets that are impinged upon the second stage moisture eliminator filter 164 simply drains down back into the second stage sump 150. Accordingly, the coolant is recycled and the second stage motor fan 154 remains fairly dry. In addition, moist wet airflow 144 is also not fed back into the atmosphere, proximal to the air intake housing 102 of the indirect evaporative cooling subsystem of the multi-stage hybrid evaporative air-cooling system 100. As with the exhausted cool air 122 of the first stage #1, the exhausted, cool, direct evaporative cooling subsystem second stage airflow 152 may be used to cool the temperature of other systems.

The two-stage version of the multi-stage hybrid evaporative cooling system 100 is secured on a base 170 that spans its entire length, and supports the two separated sumps 120 and 150 for each respective stage. Coolant is sprayed or delivered by other mechanisms by the respective distribution manifolds 130 and 160 of each stage, and is cascaded down the respective heat exchangers 112, 140 and 142 into the respective sumps 120 and 150. Therefore, a feature of the multi-stage hybrid evaporative cooling system 100 is that it provides for a portion of the indirect evaporative cooling subsystem air 114 to be first indirectly evaporatively cooled and then used as direct evaporative cooling subsystem air for the next successive stage.

As further illustrated, the second stage (and in general), the final stage of any multi-stage hybrid evaporative cooling system 100 further includes a media pump 172 that moves coolant from a final stage sump (in this case sump 150) through a media tube 174 into the air discharge housing 104. The media pump 172 moves the coolant within the final stage sump 150 to a distribution system for distributing the coolant along a top of a primary media 176 and a secondary media 178 for further cooling and washing the indirect evaporative cooling subsystem airflow 121 as it enters the discharge housing 104 as air 123. Both the primary media 176 and the secondary media 178 include respective primary cover washer 180 and a secondary cover washer 182 for forcing the coolant downwards towards the respective primary and the secondary media 176 and 178. The coolant cascading down the primary and the secondary media 176 and 178 is collected into a media sump 183, where the coolant 185 is drained through a media sump outlet 184, and back into the final stage sump 150. The coolant cascading down the medias further lowers the temperature of the airflow 123 flowing within the air discharge housing 104, where it is exhausted as airflow 116. The reason for further cooling of the airflow 121 as it enters and passes through the air discharge housing 104 as the cooler air 123 is due to further evaporation of the coolant within the discharging housing 104. In addition, the further evaporation of the coolant results in lower dry bulb temperature within the discharge housing 104, causing a further reduction of the temperature of the coolant in media sump 183, which when drained into the final stage sump 150, reduces the temperature of the coolant present within the final stage sump 150.

Figure 2:
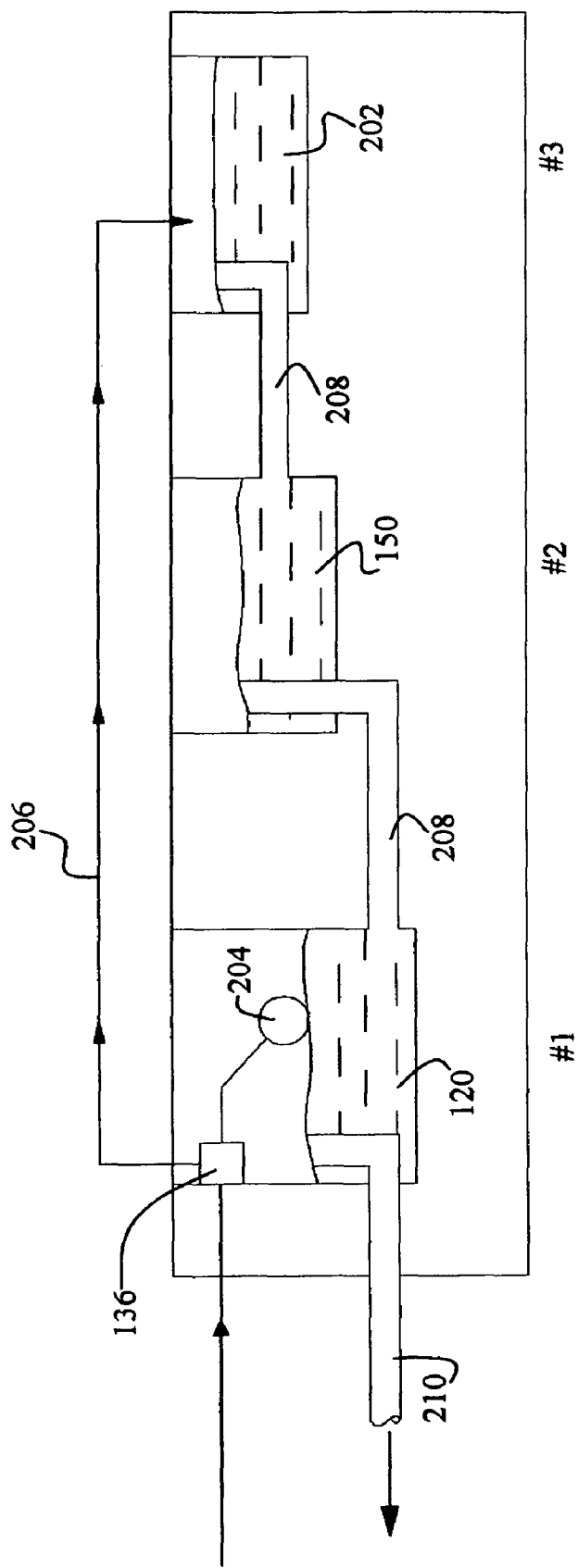
FIG. 2 is an exemplary schematic illustration for a set of cascaded sumps for an exemplary three stage system for a multi-stage hybrid evaporative air-cooling system in accordance with the present invention.

FIG. 2 illustrates a schematic section of a set of cascaded sumps for an exemplary three stage system for a multi-stage hybrid evaporating cooling system in accordance with the present invention. As illustrated, the present invention provides separate, distinct sumps 120, 150, and 202 for the coolant used by the direct evaporative cooling subsystem on the exterior surfaces of the heat exchangers. The separate sumps maintain the coldest coolant on the last stage of the multi-stage hybrid evaporative cooling system 100. As illustrated, these sumps can be arranged in a "cascade" fashion where the coolant flows from the coldest final sump 202 within the last illustrated stage #3 to the warmest sump 120 within the first illustrated stage #1.

A float valve 204 or any other coolant level regulating mechanism regulates the refilling of the coldest sump 202, as required, by the level of coolant in the warm-side sump 120. When the level in the sump 120 falls, the float valve 204 allows coolant to enter from the coolant inlet 136. The coolant line 206 from the float valve 204 to the last sump 202, allows the last sump to be refilled with coolant according to the level of the first sump 120. Coolant transfer pipes 208 and an overflow (and drain) pipe 210 complete the sump system.

Each separate sump sits at the bottom of separate delivery or spray systems with separate pumps that supply each separate delivery mechanism and sump unit. In the preferred embodiment the last sump would be at the air washer, or, at the last heat exchanger, if a direct evaporative stage were not used. In this embodiment coolant is supplied to the direct evaporative stage only and then flows down to the lowest sump where any excess water is discharged. In addition, at this point sufficient "bleed" will be employed to maintain a low concentration of dissolved solids in the coolant to prevent the build-up of dissolved solids on the walls of the heat exchanger. Because the different sumps are sufficiently thermally insulated, and the air progressing through each partition or stage is tending to be cooler than the previous stage or partition, the temperature of the thermally graded sumps both reflect this increased cooling and contribute to it. It should be noted that all coolant within the hybrid multi-stage cooling system 100 of the present invention are passed through one or more filtering mechanisms for filtering or removal of foreign objects or debris from coolant.

Figure 3:
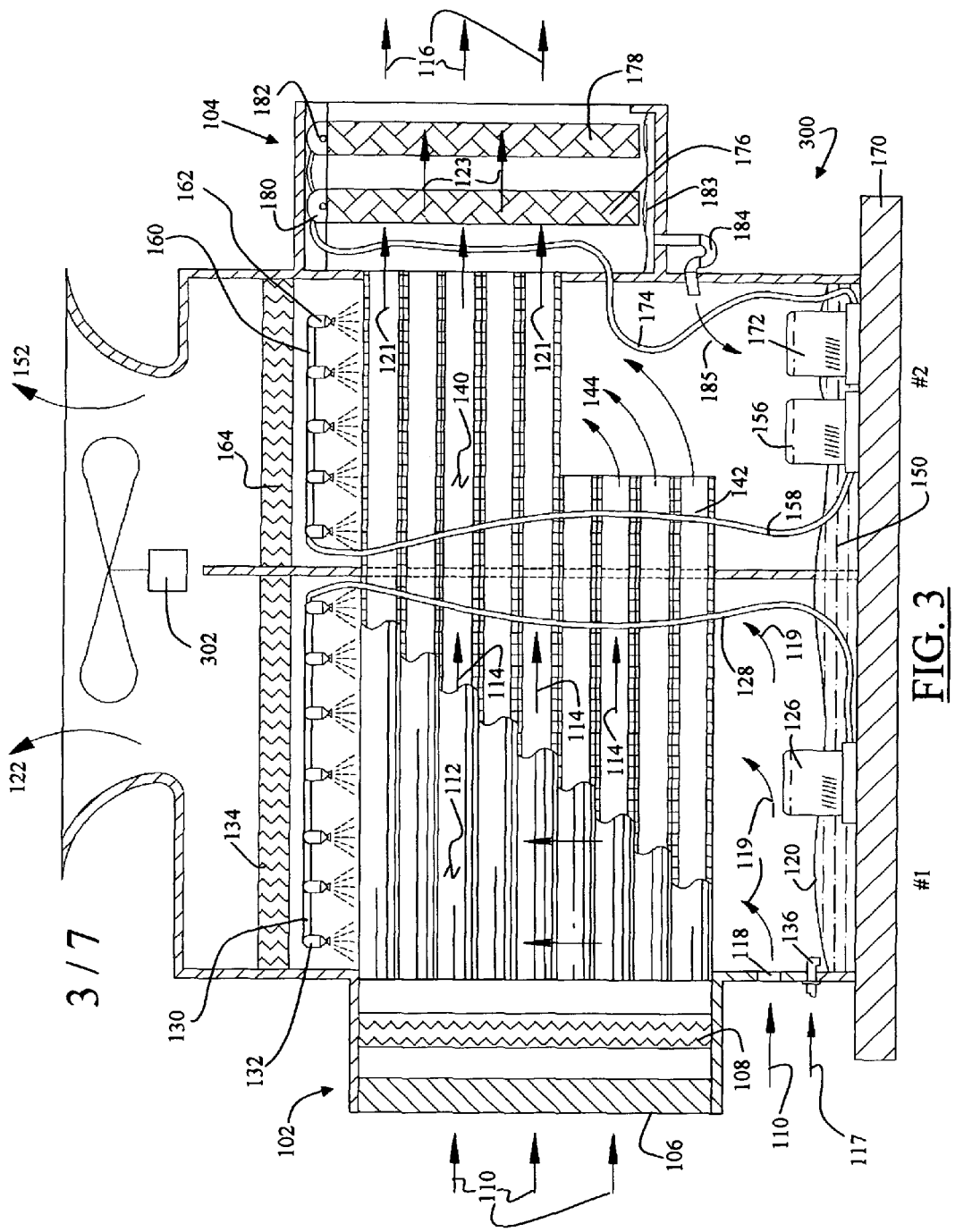
FIG. 3 is an exemplary illustration for another embodiment for a multi-stage hybrid evaporative cooling system in accordance with the present invention.

FIG. 3 is an exemplary illustration for another embodiment of a multi-stage hybrid evaporative cooling system 300, with a single direct evaporative cooling subsystem fan 302 for use with one or more stages. Each stage of the multi-stage hybrid evaporative cooling system 300 includes the same corresponding or equivalent components as each stage of the multi-stage hybrid evaporative cooling system 100 that is shown in FIGS. 1 and 2, and described above. Therefore, for the sake of brevity, clarity, and convenience the general description of FIG. 3 will not repeat every corresponding or equivalent component that has already been described above in relation to the multi-stage hybrid evaporative cooling system 100 that is shown in FIGS. 1 and 2.

As illustrated in FIG. 3, the direct evaporative cooling subsystem airflow within any stage is drawn up, and exhausted out into the atmosphere by a single direct evaporative cooling subsystem fan 302. The drawn up wet airflows move up by the single direct evaporative cooling subsystem fan 302, with coolant droplets within the airflow impinging upon a moisture eliminator elements of each stage, which filter out most of the droplet moisture from the airflow prior to exhaustion. Therefore, the remaining exhausted airflow is generally air with high humidity (assuming the coolant is water) with no droplets, and the filtered-out coolant droplets that are impinged upon the respective moisture eliminator filters within each stage simply drains down back into the respective stage sump of each stage. Accordingly, the coolant is recycled and the single motor fan 302 remains fairly dry.

Figure 4:
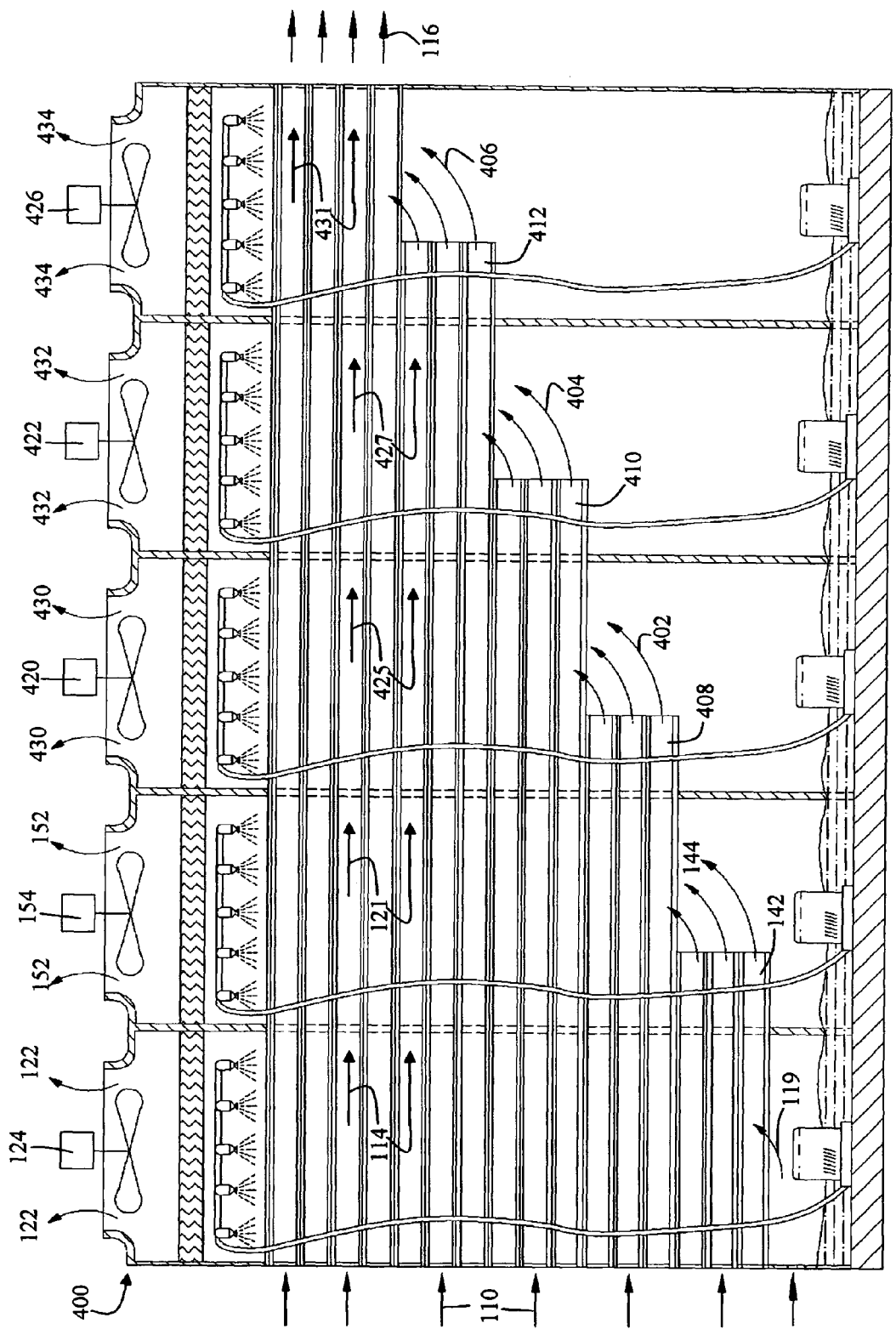
FIG. 4 is an exemplary schematic section of an N-stage (the first five of the six stages are shown) for a multi-stage hybrid evaporative cooling system in accordance with the present invention.

FIG. 4 shows a schematic section of an N-stage (the first five of the six stages are shown) multi-stage hybrid evaporative cooling system 400. Each stage of the multi-stage hybrid evaporative cooling system 400 includes the same corresponding or equivalent components as each stage of the multi-stage hybrid evaporative cooling system 100 that is shown in FIGS. 1 and 2, and described above. Therefore, for the sake of brevity, clarity, and convenience the general description of FIG. 4 will not repeat every corresponding or equivalent component that has already been described above in relation to the multi-stage hybrid evaporative cooling system 100 that is shown in FIGS. 1 and 2.

As illustrated in FIG. 4, the incoming ambient air 110 enters the indirect evaporative cooling subsystem and ultimately exits as cool, dense air 116. The same ambient air 110 enters the direct evaporative cooling subsystem, and is then drawn up as airflow 119 by the direct evaporative cooling subsystem fan 124 of the first stage. As with the two stage process that was illustrated in FIGS. 1 to 3 and described above, some of the indirect evaporative cooling subsystem air 114, 121, 425, 427, and 431 at each stage is redirected into the direct evaporative cooling subsystem at the next successive stages as air 144, 402, 404, and 406. The air 144, 402, 404, and 406 traverse the respective lower set of the subsequent stage heat exchangers 142, 408, 410, and 412, and therefore, the airflow exiting out of these particularly channels of heat exchangers becomes progressively cooler. In general, the lower set of the subsequent heat exchangers 142, 408, 410, and 412 have a length approximately equal to about one-half the horizontal length of each stage. The actual number of channels that constitute a height of the lower set of any subsequent stage heat exchanger is generally equal to or less than the number of channels of the fully extended upper channels for that stage. That is, the number of channels of the lower set of any subsequent stage heat exchangers is equal to or less than the number of channels that constitute the upper set of any subsequent stage heat exchanges.

The lower set of the subsequent stage heat exchangers 142, 408, 410, and 412 further facilitate the progressive cooling of the indirect evaporative cooling subsystem air flow 114, 121, 425, 427, and 431. The evaporation of lower temperature coolant within each successive stage takes place on the outside surfaces of these extended heat exchangers at a progressively lower wet-bulb temperature air that is lower than that of the previous stage. This cooler air evaporating a cooler coolant cascading on the lower set of the subsequent stage heat exchanger 142, 408, 410, and 412 causes a further reduction in the temperature of the air 114, 121, 425, 427, and 431, progressing through each successive stage in the sequence. In other words, by extending the lower portion of the heat exchangers into the next stage, further evaporation at even lower temperature takes place on the outside surfaces of the extended channels in the next sequential stage. This causes a further reduction in temperature of the indirect evaporative cooling subsystem airflow 114, 121, 425, 427, and 431 before it emerges into the direct evaporative cooling subsystem of the next sequential stage as airflow 144, 402, 404, and 406. The cooler direct evaporative cooling subsystem airflows 144, 402, 404, and 406, in turn, further cool the indirect evaporative cooling subsystem airflow 114, 121, 425, 427, and 431 flowing through the upper set of the subsequent heat exchangers within each stage.

Consequently, the already cooled indirect evaporative cooling subsystem (dry side) air 114, 121, 425, 427, and 431 becomes the direct evaporative cooling subsystem (wet-side) air 144, 402, 404, and 406 at each successive stage, resulting in respective lower temperature wet side air 144, 402, 404, and 406 within each respective stage, having a lower wet side dew point temperature. The overall effect is a more efficient cooled dense air 116 that exits at even a lower temperature air stream with a higher air density. The coldest coolant in the sump at the final stage further cools the coldest indirect evaporative cooling subsystem dry air 431 at stage 5 and the coldest wet side air 406 with the lowest wet bulb temperature. The lower set of the subsequent stage heat exchangers 142, 408, 410, and 412 provide a greater efficiency in terms of proving a lower dry bulb temperature, and therefore, improving the overall system efficiency. The respective fans 124, 154, 420, 422, and 426 of each stage exhaust all the direct evaporative cooling subsystem airflows 119, 144, 402, 404, and 406 as respective exhaust airflows 122, 152, 430, 432, and 434.

As with the two stage system illustrated in FIGS. 1 to 3 and described above, the system 400 illustrated in FIG. 4 also includes spray or other delivery manifolds or other coolant distribution mechanisms receiving pumped coolant from their respective sumps within each stage, and a respective moisture eliminators. The drawn up wet airflow 119, 144, 402, 404, and 406 move up by the respective direct evaporative cooling subsystem fans 124, 154, 420, 422, and 426 with coolant droplets impinging upon the respective moisture eliminator elements, which filter out most of the droplet moisture from the airflows prior to exhaustion. Therefore, the remaining exhausted airflow 122, 152, 430, 432, and 434 is generally air with high humidity (assuming the coolant is water), and the filtered-out coolant droplets that are impinged upon the moisture eliminator filters simply drains down back into their respective stage sumps. Accordingly, the coolant is recycled and the motor fans remain fairly dry. In addition, moist wet airflows are not fed back into the atmosphere, proximal to the inlet of the indirect evaporative cooling subsystem of the multi-stage hybrid evaporative air-cooling system 400.

Figure 5:
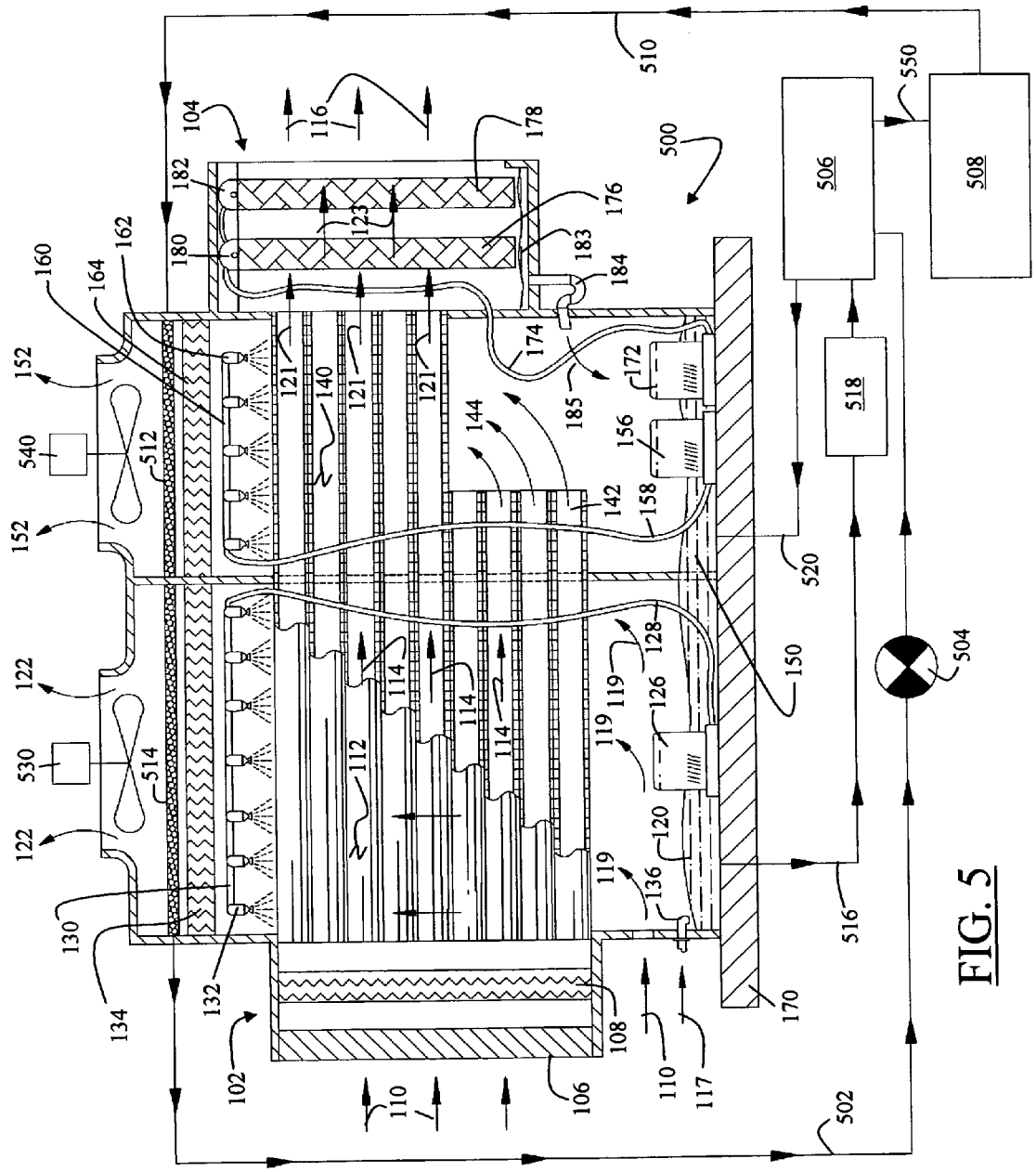
FIG. 5 is an exemplary illustration for another embodiment for a multi-stage hybrid evaporative cooling system in accordance with the present invention, which uses a novel refrigeration process to augment cooling processes.

FIG. 5 illustrates yet another embodiment for a multi-stage hybrid evaporative cooling system 500 in accordance with the present invention, which uses a novel refrigeration process to augment the cooling processes. The refrigeration system illustrated and described herein may be used with any of the embodiments disclosed. Each stage of the multi-stage hybrid evaporative cooling system 500 includes the same corresponding or equivalent components as each stage of the multi-stage hybrid evaporative cooling system 100 that is shown in FIGS. 1 and 2, and described above. Therefore, for the sake of brevity, clarity, and convenience the general description of FIG. 5 will not repeat every corresponding or equivalent component that has already been described above in relation to the multi-stage hybrid evaporative cooling system 100 that is shown in FIGS. 1 and 2.

As illustrated in FIG. 5, the multi-stage hybrid evaporative cooling system 500 includes a novel refrigeration system to further cool down the direct evaporative cooling subsystem, in particular, by cooling the accumulated coolant within the sump of each stage. Unlike most conventional refrigeration units, the refrigeration system of the present invention does not place a cooling coil within the stream of the indirect evaporative cooling subsystem airflow 114 and 121 to cool the air stream that contacts or impinges it. Instead, the refrigeration system of the present invention uses the coolant that is circulated through the direct evaporative cooling subsystem to indirectly cool the indirect evaporative cooling subsystem air stream 114 and 121.

The refrigeration system in accordance with the present invention eliminates a considerable impediment to the flow of the indirect evaporative cooling subsystem air 114 and 121, which were caused by the use of cooling coils (used in the prior art) that were placed directly across the stream of indirect evaporative cooling subsystem air flow 114 and 121 to cool the air 114 and 121. This impediment to the airflow reduced the inlet pressure factor, thereby reducing the power out of a power generating system. The airflow pressure factor is the resistance of the airflow, which is measured in inches of water. Therefore, just as when the temperature increases and the power output of the power generating unit reduces (due to a lowering of density of the air), so is also true when the airflow pressure is reduced. That is, as the airflow pressure is reduced, the power output is also reduced. Therefore, the present invention has eliminated the use of a cooling coil in the stream of the indirect evaporative cooling subsystem airflow 114 and 121 in order to cool this air, and as a result, the pressure loss in the air stream 114 and 121 for the system remains constant as the air 114 and 121 is discharged as air 123 through the air discharge housing 104 as the useful dense air 116.

As illustrated in FIG. 5, the refrigeration system of the present invention cools the accumulated coolant within the sumps by circulating the coolant by a refrigeration pump 518 from the first stage sump 120 via a coolant line 516 to a chiller-evaporator 506, where the coolant is cooled. The cooled coolant is than moved to the next stage sump 150 via a coolant return line 520. As coolant is accumulated within the next stage sump 150, any excess, additionally accumulated coolant within the next stage sump 150 cascades down to the preceding sump 120 in the preceding stage, as is described above in relation to FIG. 2.

The full cycle of the refrigerant system is comprised of an expansion device 504 where refrigerant in a liquid phase enters the expansion device 504 via refrigerant line 502, and is expanded into a low pressure vapor (or gas). Non-limiting examples of expansion devices that may be used with the present invention include capillary tubes, thermostatic expansion valves, low-side float valves, a constant-pressure expansion valve, or any other well-known expansion device appropriate for the intended use and the environment within which the present invention will be used. The function of an expansion device 504 is to reduce the pressure of the liquid refrigerant (by changing its phase from liquid to vapor), and regulate the flow of refrigerant to the evaporator-chiller 506. That is, the expansion device 504 throttles the flow of refrigerant into the evaporator-chiller 506, changing the phase of the refrigerant from a liquid to gas (vapor). In other words, the expansion device 504 allows the liquid refrigerant to have a controlled expansion, which absorbs ambient heat (latent heat) and to change its phase from liquid to gas. The now expanded vapor refrigerant inside the heat-exchangers of the chiller-evaporator 506 is a low temperature, low-pressure refrigerant gas. The low temperature low pressure refrigerant absorbs sensible heat within the tubes of the chiller-evaporator 506. As coolant is pumped by the coolant pump 518 into the chiller-evaporator 506, the coolant comes into contact with the cooling coils, tubes, or other heat transfer mechanism of the chiller-evaporator 506, and is cooled by conductive heat transfer.

The refrigerant cycle continues by moving the low temperature gas (or vapor) refrigerant from the chiller-evaporator 506 via a compressor refrigerant line 550 into the compressor 508 for compressing the refrigerant into a hot gas. The compression of the cool refrigerant gas (or vapor) coming from the chiller-evaporator 506 by the compressor 508 increases refrigerant gas temperature due to heat of compression, which is a well-known phenomenon.

The now hot gas refrigerant from the compressor 508 is moved via condenser refrigerant line 510 into a set of condenser coils 514 first in the first stage, and then 512 in the second stage, where the high temperature gas refrigerant is cooled, condensed into liquid, and fed back to the expansion device 504 via the refrigerant line 502. The present invention uses the wet side air of the direct evaporative cooling subsystem airflows 119 and 144, at essentially near a wet-bulb temperature air, to cool the condensers 514 and 512, as the wet side airflows are drawn up by a larger set of respective direct evaporative cooling subsystem fans 530 and 540.

It should be noted that the condenser refrigerant line 510 is coupled with the condenser 514, and not with the condenser 512. This enables the hot gas refrigerant to move from within the condenser refrigerant line 510 and into the condenser 514 for a first or preliminary stage cooling, which partially converts (or condenses) the gas into liquid. The now cooler, hybrid gas-liquid refrigerant is moved to the secondary stage condenser 512 for a secondary stage cooling, where the mixture gas-liquid refrigerant is further cooled and condensed into a liquid phase. The liquid refrigerant is then removed and recycled through line 502 (which is coupled with condenser 512) and into the expansion device 504, where the entire cycle repeats.

As a result of the refrigeration system of the present invention, the indirect evaporative cooling subsystem air 114 and 121 is further cooled and discharged through the air discharge housing 104 as cool, dense, useful air 116 without any pressure loss due to impediments (such as a cooling coil) placed within their stream to cool the air 114 and 121. Further, the refrigeration cycle is maintained by the direct evaporative cooling subsystem air that flows within each stage of the multi-stage hybrid evaporative cooling system to cool the condenser portion of the refrigeration cycle, without much addition of energy to cool the condenser.

Figure 6A:
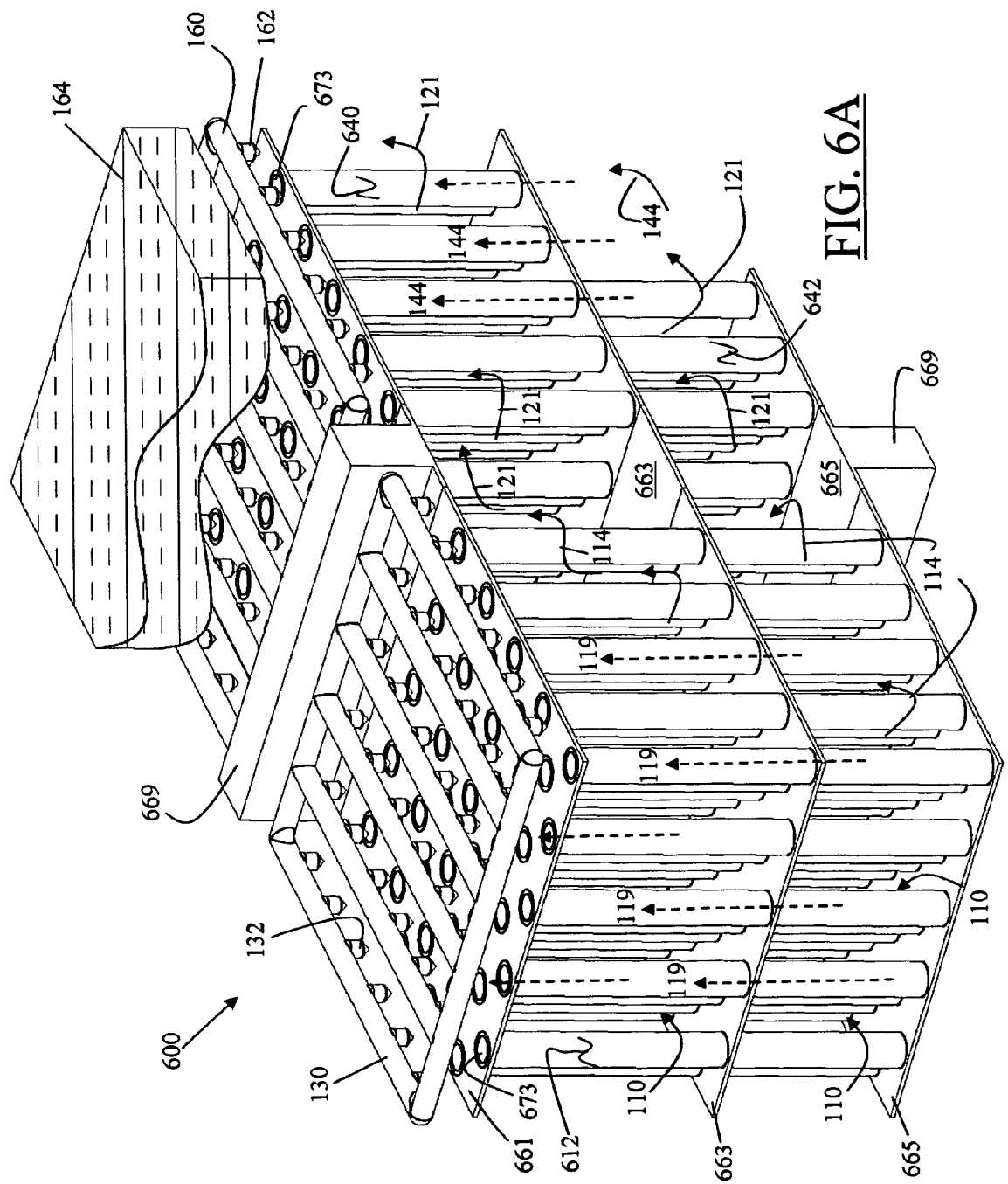
FIG. 6A is an exemplary schematic perspective view for yet another embodiment for a multi-stage hybrid evaporative cooling system in accordance with the present invention.
Figure 6B:
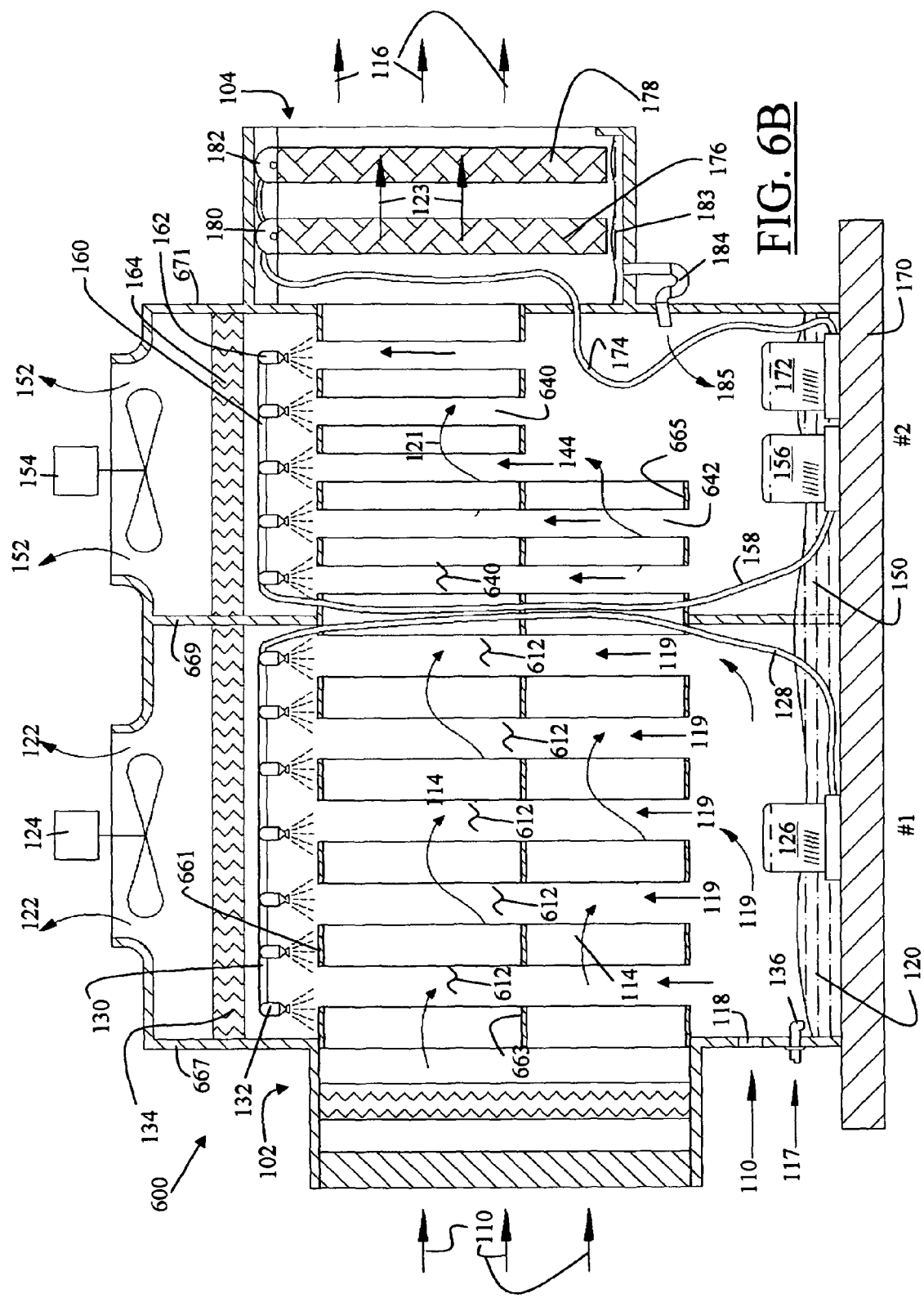
FIG. 6B is an exemplary illustration of the multi-stage hybrid evaporative cooling system of FIG. 6A.

FIGS. 6A and 6B are exemplary illustrations of a further embodiment for a multi-stage hybrid evaporative cooling system 600 in accordance with the present invention, which use a vertical set of heat exchanges. With the system 600 of the present invention the direct evaporative cooling processes take place within the interior of the vertical heat exchanger channels and the indirect evaporative cooling processes occur on the exterior of the vertical heat exchanger channels. In other words, the entire system 600 is the inside-out version of the above described systems in relation to FIGS. 1 to 5. With system 600, the wet air 119 and 144 flow inside the vertical heat exchanger channels rather than outside, and the dry air 114 and 121, flow outside the vertical heat exchanger channels rather than inside. FIG. 6A shows a schematic perspective section of only a two-stage version for a multi-stage hybrid evaporative cooling system 600 of the present invention, showing various airflow paths. FIG. 6B is an exemplary schematic view of the two stage hybrid evaporative cooling system 600 that is illustrated in FIG. 6A, also showing various airflow paths. Each stage of the multi-stage hybrid evaporative cooling system 600 illustrated in the exemplary FIGS. 6A and 6B includes the same corresponding or equivalent components as each stage of the multi-stage hybrid evaporative cooling system 100 that is shown in FIGS. 1 and 2, and described above. Therefore, for the sake of brevity, clarity, and convenience the general description of FIGS. 6A and 6B will not repeat every corresponding or equivalent component that has already been described above in relation to the multi-stage hybrid evaporative cooling system 100 that is shown in FIGS. 1 and 2. Although not shown, it will be readily apparent to those skilled in the art that system 600 may include a single direct evaporative subsystem exhaust fan (as described and illustrated in FIG. 3), multiplicity of stages (as described and illustrated in FIG. 4), and a refrigeration system (as described and illustrated in FIG. 5).

The general use of vertical set of heat exchangers is described in U.S. Pat. Nos. 4,023,949; 4,107,940; and 4,418,527, all to Schlom et. al. The entire disclosures of the U.S. Pat. Nos. 4,023,949; 4,107,940; and 4,418,527 to Schlom et al. are incorporated herein by this reference, and the information incorporated herein is as much a part of this application as filed as if the entire text and drawings of the U.S. Pat. Nos. 4,023,949; 4,107,940; and 4,418,527 were repeated in this application, and should be treated as part of the text and drawings of this application as filed.

As illustrated in FIGS. 6A and 6B, the system 600 uses a vertically oriented set of heat exchangers 612 for the first stage, and heat exchangers 640 and 642 for the second stage, with coolant sprayed or delivered by other means inside the vertical heat exchanger channels. The direct evaporative cooling subsystem is accomplished by gravity flow of coolant downwardly along the inner surfaces of the vertical heat exchangers 612, 640, and 642 in conjunction with counter current flow of direct evaporative cooling subsystem air 119 and 144 flowing up within the vertical heat exchanger channels, and being exhausted by the fans 124 and 154 for respective stages 1 and 2. The indirect evaporative cooling subsystem is accomplished by ambient air 110 flowing in thermal conductive contact with outer surfaces of the vertical heat exchangers 612, 640, and 642 for cooling thereof, the cooled air 116 being delivered to other external systems.

As further illustrated in FIGS. 6A and 6B, the vertical set of heat exchangers 612, 640, and 642 are stacked between a top header 661, a middle divider 663, and a bottom header 665 so as to form the indirect evaporative cooling subsystem (the dry side) enclosure. That is, indirect evaporative cooling subsystem enclosure is bounded on top by the header 661, middle by the divider 663, the bottom by the bottom header 665, the lateral enclosure walls 667, 669, and 671, and a front and a back wall (not shown). The top header 661 is used for preventing flow of a coolant to within the indirect evaporative cooling subsystem enclosure. The at least one divider 663 is for maintaining separation between indirect evaporative cooling subsystem airflows, with the bottom header 665 used for preventing flow of direct evaporative cooling subsystem air 119 and 144 to within the indirect evaporative cooling subsystem enclosure. The at least one divider 663 separates each stage of the multi-stage hybrid evaporative cooling system into two or more horizontal sections for maintaining horizontal separation between indirect evaporative cooling subsystem airflows. This separation allows the indirect evaporative cooling subsystem airflows 114 and 121 through a first of the two or more horizontal sections to exit out of the indirect evaporative cooling subsystem enclosure and into the direct evaporative cooling subsystem of a next stage. The separation also allows indirect evaporative cooling subsystem airflows through a second of the two or more horizontal sections to continue within the indirect evaporative cooling subsystem enclosure into a next stage.

As further illustrated, the indirect evaporative cooling subsystem air 114 and 121 flow freely outside the heat exchangers, and are cooled through conductive heat transfer with the heat exchangers 612, 640, and 642. The direct evaporative cooling subsystem air 119 and 144 flows up into the heat exchangers channels, exiting out of the heat exchanger openings 673, and exhausted by the exhaust fans 124 and 154 of the respective first and second stage. Simultaneously, coolant is sprayed or delivered by other mechanisms within the heat exchanger channels, with the header 661 protecting the indirect evaporative cooling subsystem chamber from the coolant by directing the coolant to within the top openings 673 of the heat exchangers 612, 640, and 642. As illustrated, a first portion of the direct evaporative cooling subsystem within a next stage substantially extends a vertical length of the stage, with a second portion partially extending the vertical length of the stage, thereby facilitating a further cooling of a next stage indirect evaporative cooling subsystem.

As with other embodiments that are described and illustrated above, the direct evaporative cooling subsystem of the multi-stage hybrid evaporative cooling system 600 is also comprised of sumps 120 and 150 within each stage for holding coolant. The coolant is provided to the heat exchangers by pumps 126 and 156 within each stage. The pumps 126 and 156 move the coolant to distribution manifolds 134 and 160 for delivery or spray of the coolant (through the spray nozzles or other coolant distributing mechanisms 132 and 162) within the heat exchanger channels. The direct evaporative cooling subsystem airflow within the heat exchanger channels evaporates the coolant flowing down within the heat exchanger channels for indirect evaporative cooling of an indirect evaporative cooling subsystem airflow exterior to the heat exchanger channels through conductive heat transfer.

As further illustrated in FIGS. 6A and 6B, the second stage heat exchangers are comprised of an upper set of second stage heat exchangers 640 that span a full horizontal length of the second stage, and are capped by the header 661 at the top and the divider 663 at the bottom. The second stage heat exchangers are also comprised of a lower set of second stage heat exchanges 642 that are capped by the divider 663 at their top and the bottom header 665 at their bottom. The indirect evaporative cooling subsystem enclosure provides for a continuous flow of indirect evaporative cooling subsystem airs 114 and 121 from one stage to the next subsequent stage. Therefore, the indirect evaporative cooling subsystem air 114 flowing from the first stage within the upper horizontal section (created by the divider 663) continuously flows into the next stage as a much cooler air 121 and is exhausted through the air discharge housing 104. The indirect evaporative cooling subsystem air 114 flowing from the first stage lower horizontal section continuously flows over the lower vertical heat exchangers 642 and is cooled and exhausted into the second stage as cooler direct evaporative cooling subsystem air 144.

As illustrated in FIGS. 6A and 6B, some of the indirect evaporative cooling subsystem (dry side) airflow 114 of the first stage heat exchangers 612 is exited and redirected over the lower set of the second stage heat exchangers 642, and into the direct evaporative cooling subsystem as second stage direct evaporative cooling subsystem air 144. The second stage direct evaporative cooling subsystem airflow 144 is cooler than the preceding stage airflow 119 because the second stage direct evaporative cooling subsystem airflow 144 has already gone over the first stage heat exchangers 612 as air flow 114, and therefore, has been substantially cooled. In addition, in accordance with the present invention, the second stage direct evaporative cooling subsystem airflow 144 has also traversed over the lower set of the second stage heat exchangers 642, which are cooler than the first stage heat exchangers 612, the reasons for which are described below. Therefore, the airflow exiting out of the first stage and passing over the lower set of heat exchangers 642 is in fact cooler than the airflow over the preceding stage heat exchangers 612.

The lower set of any subsequent stage heat exchangers further facilitates the evaporation of a lower temperature coolant to take place within the heat exchanger channels with a lower wet bulb temperature air. This causes further reduction in the temperature of the indirect evaporative cooling subsystem air flowing over the heat exchangers 642, and into the subsequent stage. More specifically, and in relation to FIGS. 6A and 6B, the lower set of the second stage heat exchangers 642 allows further evaporation of coolant at even lower temperature to take place within the lower set of the second stage heat exchangers 642. This causes a further reduction in temperature of the indirect evaporative cooling subsystem airflow 114 before it emerges as the direct evaporative cooling subsystem of the next subsequent stage (the second stage), as direct evaporative cooling subsystem air 144.

In general, the lower set of any subsequent stage heat exchangers have a length of approximately equal to a vertical length of an upper set. The actual number of channels that constitute a width of the lower set of any subsequent stage heat exchangers is generally less than the number of channels of the fully extended upper channels of the upper set of the second stage heat exchangers. That is, the number of channels of the lower set of any subsequent stage heat exchangers is less than the number of channels that constitute the upper set of any subsequent stage heat exchanges.

The much cooler direct evaporative cooling subsystem air 144 at the second stage passes over a second stage sump 150, and is subsequently drawn up and drawn out (referenced as 152) into the atmosphere by a second stage direct evaporative cooing subsystem fan 154. The second stage sump 150 further includes a second stage pump 156 that moves coolant stored within the second stage sump 150 through a second stage tube 158 to a second stage coolant distribution manifold 160. The second stage coolant distribution manifold 160 is comprised of one or more nozzles or other coolant distributing mechanisms 162 through which coolant (such as water) is sprayed or delivered by other means, and cascades down the interior portion of the upper and lower set of second stage heat exchangers 640 and 642 to cool down the interior channels of the upper and lower heat exchanger of the second stage. The second stage direct evaporative cooling subsystem airflow 144 (or wet airflow) moving up within the heat exchangers of the second stage that contacts the cascading coolant, and facilitates the evaporation of the cascading coolant. This evaporation directly cools the interior of the heat exchanger channels, and indirectly cools the dense or useful airflow 121 flowing over the upper and lower set of the second stage heat exchangers 640 and 642. In other words, the wet side airflow within the second stage heat exchanger channels causes the direct evaporation of the coolant therein, and the dense side airflow 121 is cooled indirectly by this evaporation through conductive heat transfer between itself and the exterior walls of the heat exchanger channels. The direct evaporative cooling subsystem air 144 moving up the second stage from within the interior of the second stage heat exchanger channels facilitates the further evaporation of the cascading coolant therein at even lower temperature within the interior of the second stage heat exchangers 640 and 642. This evaporation directly cools air (due to latent heat) within the channels further, and indirectly further cools the indirect evaporative cooling subsystem air 121 through conductive heat transfer, flowing over both the upper and lower set of second stage heat exchangers 640 and 642.

As with other embodiments, the direct evaporative cooling subsystem is comprised of exhaust units 124 and 154 (one for each stage or one unit for the entire system as illustrated in FIG. 3) in the stage of the multi-stage hybrid evaporative cooling system for exhausting a direct evaporative cooling subsystem airflow from the direct evaporative cooling subsystem. It further includes moisture eliminators 130 and 164 in each stage of the multi-stage hybrid evaporative cooling system for removing coolant droplets from the direct evaporative cooling subsystem airflow prior to exhausting the direct evaporative cooling subsystem airflow from the direct evaporative cooling subsystem. Coolant within the sump 150 of a final stage #2 of the multi-stage hybrid evaporative cooling system 600 is provided to a media pump 172, moving the coolant to a distribution system for distributing coolant along a top 180 and 182 of a media 176, and 178 for further cooling and washing the indirect evaporative cooling subsystem airflow 123. As indicated above, the multi-stage hybrid evaporative cooling system 600 may include a refrigeration unit for further cooling of the direct evaporative cooling subsystem air 116.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, variations and alternate embodiments are contemplated, and can be made without departing from the spirit and scope of the invention.

What is claimed is:

1. A multi-stage hybrid evaporative cooling system comprising:
    a first stage including a first plurality of heat exchangers, the first plurality of heat exchangers configured to exchange heat between a first direct evaporative cooling subsystem and a first indirect evaporative cooling subsystem; and
    a second stage adjacent to the first stage, the second stage including a chamber, a second plurality of heat exchangers, the second plurality of heat exchangers configured to exchange heat between a second direct evaporative cooling subsystem and a second indirect evaporative cooling subsystem;
    wherein the second plurality of heat exchangers has an upper set of heat exchangers and a lower set of heat exchangers, the lower set of heat exchangers extending only partially through the chamber of the second stage, the lower set of heat exchangers has at least some airflow out of an outlet of the lower set that surrounds an exterior surface of an end section of the lower set of heat exchangers and the airflow flows through the second direct evaporative cooling subsystem.

2. The multi-stage hybrid evaporative cooling system of claim 1, wherein the first stage further includes a first sump configured to hold coolant, such that, in operation, the coolant is delivered to the first plurality of heat exchangers.

3. The multi-stage hybrid evaporative cooling system of claim 2, wherein the second stage further includes a second sump configured to hold coolant, such that, in operation, the coolant is delivered to the second plurality of heat exchangers.

4. The multi-stage hybrid evaporative cooling system of claim 3, wherein the first sump and the second sump are fluidly coupled such that coolant from the second sump flows to the first sump.

5. The multi-stage hybrid evaporative cooling system of claim 1, further comprising at least one media configured to receive coolant, the at least one media positioned such that, in operation, air emerging from the second indirect evaporative cooling subsystem passes through the at least one media.

6. The multi-stage hybrid evaporative cooling system of claim 5, wherein the at least one media is further configured such that the coolant received at the at least one media flows to a sump of the second stage.

7. The multi-stage hybrid evaporative cooling system of claim 1, further comprising:
    a refrigeration unit including:
        an expansion device configured to cause a liquid refrigerant to become a low temperature, low pressure refrigerant;
        an evaporator-chiller configured to lower a temperature of a coolant using the low temperature, low pressure refrigerant;
        a compressor configured to compress the low temperature, low pressure refrigerant from the evaporator-chiller to generate a high temperature, high pressure refrigerant; and
        a condenser coil configured to cool the high temperature, high pressure refrigerant from the compressor to generate a medium temperature refrigerant, the condenser coil coupled to the expansion device.

8. The multi-stage hybrid evaporative cooling system of claim 7, wherein the refrigeration unit is configured such that the coolant from the evaporator-chiller is delivered to a sump of the second stage.

9. The multi-stage hybrid evaporative cooling system of claim 7, wherein at least a portion of the condenser coil is positioned along a path of an airflow of at least one of the first direct evaporative cooling subsystem and the second direct evaporative cooling subsystem.

10. The multi-stage hybrid evaporative cooling system of claim 1, wherein the second plurality of heat exchangers comprise horizontal heat exchanger channels, and wherein, in operation, the at least some air emerges from the at least one of the second plurality of heat exchangers that extends only partially through the second stage to flow through the second direct evaporative cooling subsystem.

11. The multi-stage hybrid evaporative cooling system of claim 1, wherein the outlet of the lower set of heat exchangers is spaced apart from a nearest wall of the second stage to allow air flowing from the outlet to circulate about the exterior surface of the end section prior to flowing out of the second direct evaporative cooling subsystem.

12. A multi-stage hybrid evaporative cooling system comprising:
    a first stage including a first plurality of heat exchangers, the first plurality of heat exchangers configured to exchange heat between a first direct evaporative cooling subsystem and a first indirect evaporative cooling subsystem; and
    a second stage adjacent to the first stage, the second stage including a chamber and a second plurality of heat exchangers, the second plurality of heat exchangers configured to exchange heat between a second direct evaporative cooling subsystem and a second indirect evaporative cooling subsystem;
    wherein the second plurality of heat exchangers includes an upper set of heat exchangers and a lower set of heat exchangers, the lower set of heat exchangers extending only partially through the chamber of the second stage, the lower set of heat exchangers having at least some airflow out of the open end section flowing about an exterior surface of the open end section and the airflow flowing through the second direct evaporative cooling subsystem.

13. The multi-stage hybrid evaporative cooling system of claim 12, wherein the opening of the open end section is positioned at a central region of the chamber, such that, in operation, at least some of the air that flows out of the opening cools the open end section prior to flowing out of the second direct evaporative cooling subsystem.

14. The multi-stage hybrid evaporative cooling system of claim 12, wherein the open end section is configured to transfer heat between the air that flows through a passageway of the open end section and the second direct evaporative cooling subsystem before the air in the passageway flows out of the opening and into the chamber.

* * * * *